United States Patent [19]

Butler et al.

[11] Patent Number: 4,469,016

[45] Date of Patent: Sep. 4, 1984

[54] SPRING SAFETY DEVICE

[75] Inventors: Ronald G. Butler, Lancaster; John R. Lehman, Columbia, both of Pa.

[73] Assignee: International Telephone and Telegraph Corporation, New York, N.Y.

[21] Appl. No.: 343,625

[22] Filed: Jan. 28, 1982

[51] Int. Cl.³ .................... F01B 29/00; F01B 31/00
[52] U.S. Cl. .................... 92/128; 92/130 C; 251/58
[58] Field of Search ............ 92/130 R, 130 C, 130 D, 92/131, 128; 251/58

[56] References Cited

U.S. PATENT DOCUMENTS

| 3,187,642 | 6/1965 | Cruse  | 92/128 |
| 3,727,523 | 4/1973 | Gulick | 92/130 C |
| 3,824,901 | 7/1974 | Shafer | 92/130 C |
| 3,955,479 | 5/1976 | McLuckie | 92/130 R |
| 4,350,081 | 9/1982 | Fry et al. | 92/128 |

Primary Examiner—Paul E. Maslousky
Attorney, Agent, or Firm—John T. O'Halloran; Robert P. Seitter

[57] ABSTRACT

A self-contained spring biasing device, particularly useful for providing a movement-resisting force on the power shaft of a valve actuator, comprises spring cartridge means and safety means. The spring cartridge means has therein a compression spring and a bearing plate that is pushed by the power shaft to compress the spring and resist movement of the shaft. The safety means is accessible from the exterior of the spring cartridge means and removably secures the power shaft to the bearing plate, thus preventing the spring from launching the spring cartridge means from the actuator.

9 Claims, 3 Drawing Figures

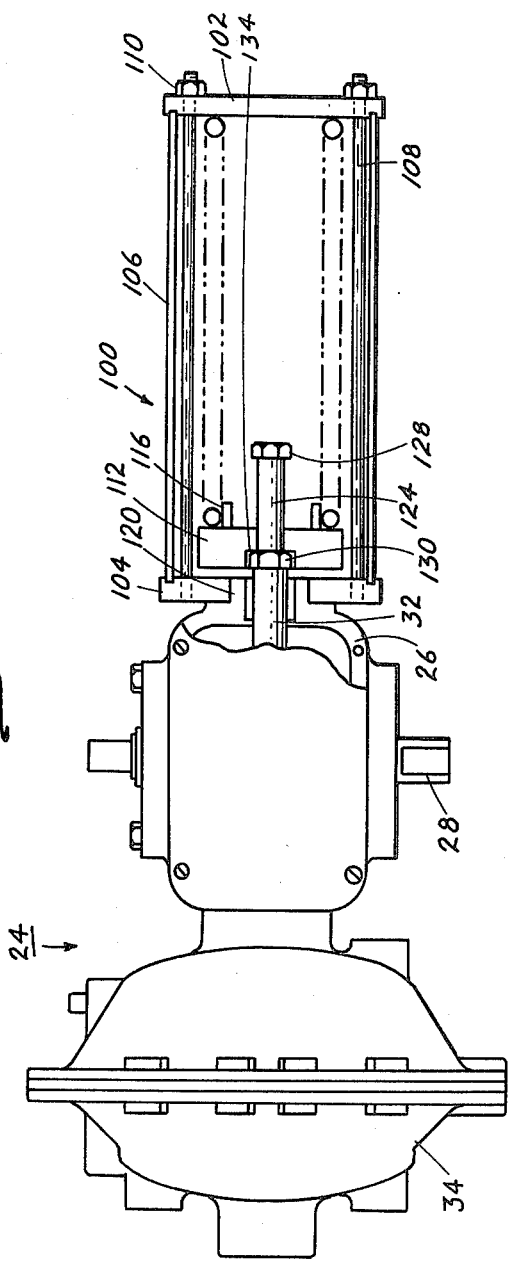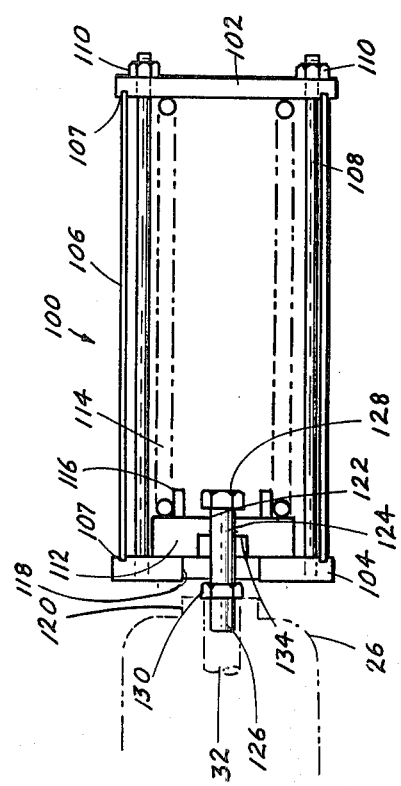

SPRING SAFETY DEVICE

BACKGROUND OF THE INVENTION

1. Field of the Invention

The present invention relates to a spring biasing device and, more particularly, to a safety means for a spring biasing device.

2. Description of the Prior Art

Many mechanisms, such as the brake actuator shown in U.S. Pat. No. 3,508,470 to Swander, Jr. et al, use a spring biasing device to urge a shaft in a particular direction or provide a movement-resisting force on the shaft. Valve actuators exemplify one type of mechanism in which spring biasing devices have been found particularly useful. U.S. Pat. Nos. 1,517,728 to Heath; 2,796,856 to Gratzmuller; 3,175,473 to Boteler et al; 3,591,127 to Luger et al; 3,727,523 to Gulick; 3,824,901 to Shafer; 4,087,074 to Massey et al; and 4,261,546 to Cory et al and French patent 1,425,399 show various configurations of spring biasing devices used with valve actuators. U.S. Pat. No. 2,198,026 to Farmer shows another application for a spring biasing device, a mechanism to direct a signal horn and U.S. Pat. Nos. 2,402,400 to Hewitt et al shows a spring biased regulating device.

The valve actuators described in the Gulick and Cory et al patents illustrate particularly well both the advantages and dangers inherent in known self-contained spring biasing devices that are easily detachable from the actuator. The spring biasing device shown in those patents comprises a cylinder that is detachably secured to the actuator. The front end plate of the cylinder removably attaches the spring biasing device to the actuator. The actuator power shaft passes through an opening in the front end plate of the cylinder and abuts a bearing plate inside the cylinder. As the shaft pushes the bearing plate toward the rear end plate of the cylinder, it compresses a spring between the bearing plate and the rear end plate. The actuator power shaft abuts the bearing plate, but is not connected to it. That makes the actuator very versatile because the entire spring biasing device can be quickly removed from the actuator and replaced with another merely by disconnecting from the actuator the front end plate of the cylinder of one device and connecting in its place the front end plate of the cylinder of another device. By the same token, failure of the connection between the cylinder and the actuator allows the spring to launch the entire spring biasing device from the actuator. Because actuators like that shown in the Cory et al patent routinely use springs capable of generating forces well in excess of 2000 pounds and spring biasing devices weighing over 100 pounds, they can be potentially very dangerous.

Connecting the actuator power shaft to the bearing plate will greatly diminish the potential danger inherent in such an actuator. In many spring biasing devices the shaft does attach to the bearing plate. For example, U.S. Pat. No. 3,903,704 to Spiridonov shows such an arrangement in a spring biasing device used to anchor a pipeline. And the Shafer patent shows a valve actuator in which an extension of the actuator power shaft is welded to the bearing plate. But if the power shaft and bearing plate of an actuator like that shown in the Gulick or Cory et al patent are connected as shown in the Spiridonov or Shafer patent, the actuator's versatility is largely lost.

SUMMARY OF THE INVENTION

The present invention is a self-contained spring biasing device for use with a power shaft mounted in a support structure for reciprocating movement along the shaft axis. The spring biasing device comprises spring cartridge means having therein a spring, for providing a movement-resisting force on the shaft when the spring is deformed, and a spring-restraining means, for cooperating with the shaft and the spring to deform the spring when the shaft is moved. The spring cartridge means also comprises attachment means for removably securing the spring cartridge means to the support structure against the force exerted by the spring. Finally, the self-contained spring biasing device of the present invention comprises safety means, accessible from the exterior of the spring cartridge means, for removably securing the spring-restraining means to the shaft to prevent disassembly of the spring cartridge means from the support structure.

BRIEF DESCRIPTION OF THE DRAWINGS

FIG. 2 is a partial sectional view of the valve actuator shown in FIG. 1.

FIG. 3 is a detail partial sectional view of the embodiment shown in FIGS. 1 and 2 of the spring safety device of the present invention.

DETAILED DESCRIPTION OF AN EMBODIMENT OF THE INVENTION

Figure 1:
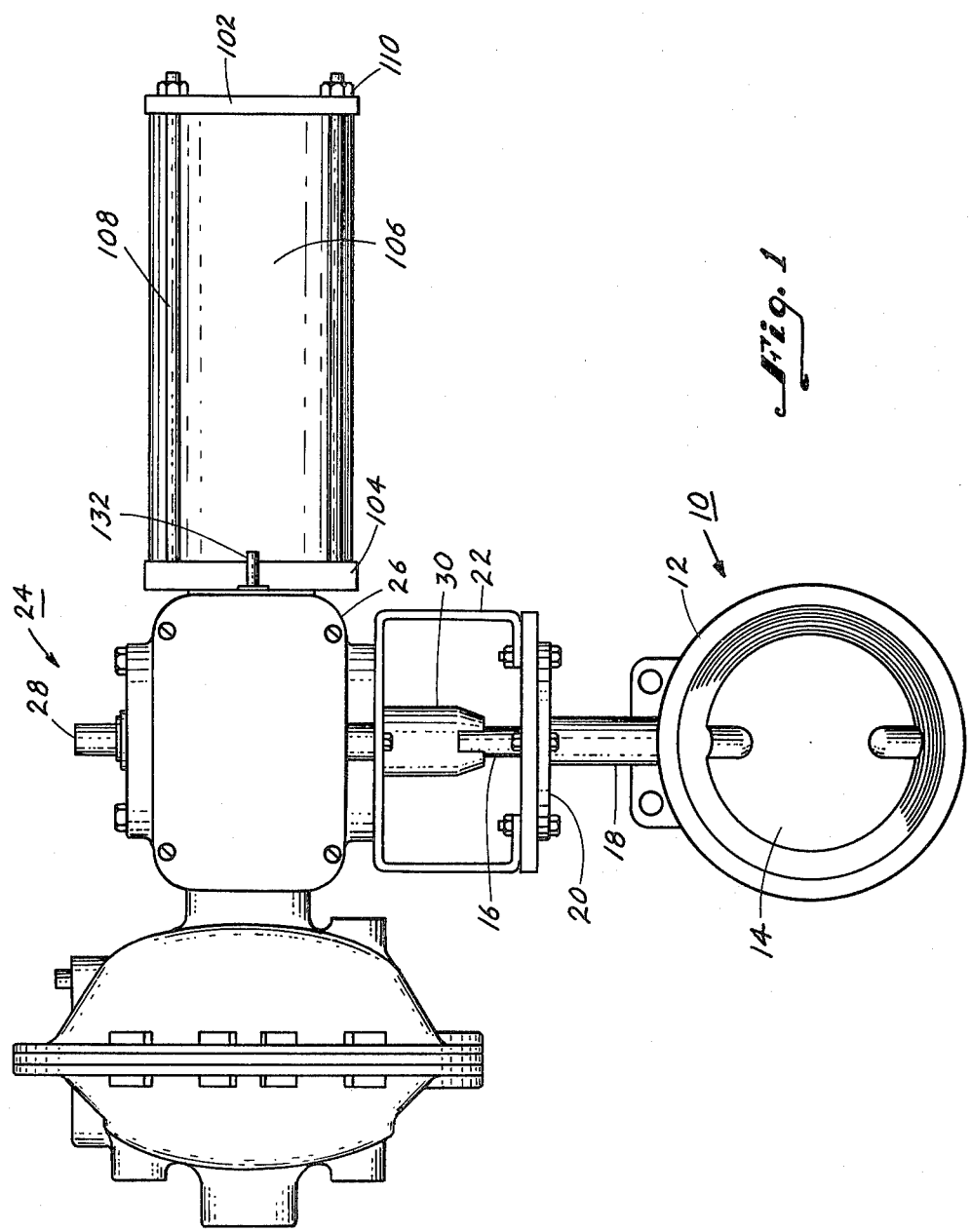
FIG. 1 is a front view of a butterfly valve actuator incorporating one embodiment of the spring safety device of the present invention.

FIG. 1 shows a butterfly valve 10 having a cast valve body 12. A valve disc 14 is mounted in the valve body 12 for rotation between open and closed positions by a valve stem 16. The valve body 12 includes a hub 18 terminating in a flange 20. The flange 20 forms a mounting platform for a coupling housing 22. An actuator 24 for the butterfly valve 10 includes a linkage housing 26 that attaches to the coupling housing 22 to secure the valve actuator 24 to the valve 10. An actuator output shaft 28 is mounted for rotation in the linkage housing 26. A coupling 30 in the coupling housing 22 secures the actuator output shaft 28 to the valve stem 16 to cause rotation of the valve stem 26 and thus the valve disc 14, when the actuator output shaft 28 rotates.

FIG. 2 shows the valve actuator 24 in more detail. The linkage housing 26 mounts an actuator power shaft 32 for reciprocating movement along the axis of the power shaft 32. One end (not shown) of the actuator power shaft 32 extends from the linkage housing 26 into a power source 34. The other end of the actuator power shaft 32 cooperates with the safe spring biasing device 100 of the present invention. A linkage means (not shown) inside the linkage housing 26 converts the linear reciprocating movement of the actuator power shaft 32 into rotary movement of the actuator output shaft 28 to actuate the valve 10. Typically, the power source 34 is pneumatic motor with a diaphragm to which the one end of the actuator power shaft 32 is attached. The linkage means can be a rack-and-pinion mechanism, a toggle linkage, a scotch yoke, or any other well-known means for converting linear motion to rotary motion.

The power source 34 provides a force on the actuator power shaft 32 forcing it to the right as shown in FIG.

1 or 2. As the actuator power shaft 32 moves to the right, the linkage causes the actuator output shaft 28, and thus the coupling 30, the valve stem 16 and, ultimately, the valve disc 14, to rotate. The spring biasing device 100 resists the movement to the right of the actuator power shaft 32 and, when the force from the power source 34 is removed, returns the actuator (and the valve disc 14) to the "rest" position.

The safe spring biasing device 100 of the present invention provides safety means to prevent the device from becoming a projectile if the connection holding it to the linkage housing fails.

FIGS. 2 and 3 show the safe spring biasing device 100. A spring cartridge means includes a square rear bearing plate 102 and a square attachment plate 104 held apart by a circular cylinder 106. FIGS. 2 and 3 show the cylinder 106 cut away to reveal the arrangement of other elements inside the spring cartridge means. The ends of the cylinder 106 fit into grooves 107 in the faces of the plates 102 and 104. Four tension rods 108, having threaded ends, extend between the rear bearing plate 102 and the attachment plate 104 outside the cylinder 106. One end of each rod 108 screws into a hole in the attachment plate 104. Nuts 110 are screwed onto the ends of the rods 108 that extend through the rear bearing plate 102. The nuts 110 are tightened against the rear bearing plate 102 and welded into place to prevent inadvertent disassembly of the spring cartridge means. A front bearing plate 112 is located between the rear bearing plate 102 and the attachment plate 104. The spring cartridge means also includes a compression coil spring 114 disposed between the front bearing plate 112 and the rear bearing plate 102. A number of pins 116 secured to the front bearing plate 112 hold the spring 114 in place and prevent it from slipping off the face of front bearing plate 112. The spring 114 can, of course, be held in place by other means, such as a shoulder formed on the front bearing plate.

The attachment plate 104 has a threaded opening 118, smaller than the front bearing plate 112, centrally located therein. The threaded opening 118 cooperates with a raised threaded boss 120 on the linkage housing 26 to secure the attachment plate 104 to the linkage housing 26. The actuator power shaft 32 extends through the boss 120, and thus through the opening 118 in the attachment plate 104, and bears against the front bearing plate 112.

As the power source 34 moves the actuator power shaft 32 to the right, as viewed in FIGS. 1 and 2, the front and rear bearing plates 112 and 102 act as spring restraining means that cooperates with the power shaft 32 to deform the spring and thereby provide a movement-resisting force on the shaft. The attachment plate 104 comprises attachment means for holding the spring cartridge means to the linkage housing 26 against the force exerted by the spring 114. As can be readily appreciated, failure of the attachment means when the spring is compressed can cause the spring to launch the spring cartridge means if the spring-restraining means is not also secured to the power shaft.

The attachment means shown in FIGS. 2 and 3 for attaching the spring cartridge means to the linkage housing 26 is particularly advantageous because it permits quick removal of the spring biasing device from the linkage housing. The spring cartridge means is turned relative to the linkage housing 26, which unscrews the attachment plate 104 from the threaded boss 120 on the linkage housing 26. Attachment means according to this embodiment of the invention makes it very easy to remove the spring biasing device for maintenance or to replace it with another having different operating characteristics. At the same time, the chances for failure of the connection are increased because the spring biasing device is attached to the linkage housing at one point. In such an arrangement, the safety means of the spring biasing device of the present invention is particularly important.

As shown in FIGS. 2 and 3, the front bearing plate 112 has an aperture 122 therein. A bolt 124 acts as a retaining member. The bolt 124 has an elongated body portion or shank that extends through the aperture 122 with sufficient clearance to allow the bolt 124 to slide easily relative to the front bearing plate 112. Threads 126 on the first threaded end of the bolt cooperate with a threaded axial hole (not shown) in the end of the actuator power shaft 32 to enable a threaded connection to be made between the power shaft 32 and the bolt 124. The bolt 124 has at its second end a bolt head 128 that is larger than the aperture 122 in the front bearing plate 112. As shown in FIG. 3, a locking nut 130 tightens against the end of the power shaft 32 to prevent inadvertent separation of the power shaft 32 and the bolt 124. The locking nut 130 is smaller than the threaded opening 118 in the attachment plate 104.

The self-contained spring biasing device 100 of the present invention is assembled by placing the front bearing plate 112, with the bolt 124 extending through the aperture 122 and the locking nut 130 in place, on top of the attachment plate 104 with the threaded end of the bolt 124 extending through the opening 118 in the attachment plate 104. The spring 114 is put into position over the pins 116 and one end of the cylinder 106 is inserted into the groove 107 in the face of the attachment plate 104. The rear bearing plate 102 is pressed against the spring 114 (this is done by machine if the spring is too stiff to do it by hand). The rear bearing plate 102 is secured, using the tension rods 108 and the nuts 110, with the other end of the cylinder 106 in the groove 107 in the face of the rear bearing plate 102. The nuts 110 are welded to the rear bearing plate 102 and the tension rods 108. The cylinder 106 acts as a closure member to enclose the spring cartridge means with the front bearing plate 112 and the spring 114 inside. The bolt 124 remains accessible from the exterior of the spring cartridge means and enables the front bearing plate 112 to be removably secured to the power shaft 32.

Assembly of the spring biasing device 100 to the linkage housing 26 of the actuator is easily accomplished with the advantageous quick-change attachment means already discussed. The power source 34 is activated to extend the actuator power shaft 32 to the right (as shown in FIG. 3) for easier access. The locking nut 130, on the threads 126 on the first end of the bolt 124, is pulled through the opening 118 in the attachment plate 104. The bolt 124 is screwed into the end of the power shaft 32 and the locking nut 130 is tightened against the end face of the actuator power shaft 32.

The actuator power shaft 32 is now secured to the front bearing plate 112, and the spring biasing device is partially assembled to the actuator. To complete the assembly the attachment plate 104 must be secured to the linkage housing 26. The power source 34 is deactivated allowing the actuator power shaft 32 to be retracted. If the actuator has travel stops that limit the movement of the actuator power shaft 32 to the left (as shown in FIG. 2), they will have to be adjusted at this stage of the assembly to allow the end of the actuator power shaft 32 to retract until the locking nut 130 contacts the face of the threaded boss 120 on the linkage housing 26. Phantom lines in FIG. 3 show the position of the actuator power shaft 32 and the mounting boss 120 at this stage of assembly. The shank of the bolt 124 is long enough to permit complete separation of the attachment plate 104 and the mounting boss 120 when the spring biasing device is in this partially assembled position. The threaded opening 118 on the attachment plate 104 is then screwed onto the threaded boss 120 on the linkage housing 26.

As an additional safety feature, a pin 132 is driven into a hole drilled into the linkage housing 26 so that it bears against an edge of the attachment plate 104 (see FIG. 1.) The pin 132 serves as an antirotation device to prevent the square attachment plate 104 from inadvertently unscrewing from the threaded boss 120. The pin 132 is easily pulled from the hole using pliers to enable removal or change of the spring biasing device.

To complete installation the travel stops are reset so that the "at rest" position of the actuator (as shown in FIG. 2) corresponds to the desired angular orientation of the actuator output shaft 28.

The front bearing plate 11 includes abutment means that cooperate with the locking nut 130 to provide a pushing surface on the front bearing plate 112. The abutment means comprises a counterbore 134 in the face of the front bearing plate 112. The counterbore 134 is concentric with the aperture 122 and accepts the locking nut 130 therein. The counterbore 134 has a depth equal to or greater than the thickness of the locking nut 130. The face of the locking nut 130 abuts the bottom of the counterbore 134 when the spring biasing device 100 is completely assembled to the actuator.

The safety means of the present invention will not impair the versatility of prior art actuators that feature quick installation and removal of spring biasing devices. In the present invention the elongated shank of the bolt enables assembly of the front bearing plate to the power shaft in an operation completely separate from assembly of the spring cartridge means to the actuator. The counterbore in the front bearing plate enables assembly of the spring cartridge means to the actuator without requiring compression of the spring.

In operation, activation of the power source 34 extends the actuator power shaft 32 to the right as seen in FIG. 2. The power shaft 32 pushes the front bearing plate 112 toward the rear bearing plate 102, compressing the spring 114 and providing a movement-resisting force on the power shaft 32. When the power source 34 is deactivated, the spring 114, acting on the front bearing plate 112, pushes the power shaft 32 toward its "rest" position.

Those skilled in the art will recognize that the safety spring biasing device has application beyond use with a valve actuator and that modifications, other than those specifically described, to the embodiment of the invention disclosed herein can be made without departing from the spirit of the invention. For example, the attachement and front and rear bearing members can have configurations other than the plates shown, or the plates can have shapes other than those described. Thus, the scope of the present invention is not limited by the foregoing description of one embodiment but rather is defined solely by the appended claims.

We claim:

1. A self contained spring biasing device for use with a power shaft having a longitudinal axis and mounted in a support structure for reciprocating movement along the shaft axis, the spring biasing device comprising:

spring cartridge means including an attachment member for removably securing said spring cartridge means to the support structure, a rear bearing member secured to and spaced from said attachment member, a front bearing member disposed between said attachment member and said rear bearing member, said attachment member having an opening therein for passage of the shaft into said spring cartridge means, said front bearing member being larger than said opening, and a compression spring disposed between said front bearing member and said rear bearing member for providing a movement resisting force on the shaft and for resisting movement of said front bearing member by the shaft toward said rear bearing member; and safety means enabling the shaft to be secured to said front bearing member, said safety means being accessible from the exterior of said spring cartridge means for removably securing said front bearing member to the shaft to prevent disassembly of said spring cartridge means from the shaft.

2. The spring biasing device recited in claim 1 wherein:

said attachment member comprises an attachment plate;

said front bearing member comprises a front bearing plate that provides a surface for receiving force from the shaft to push said front bearing plate toward said rear bearing plate when the shaft is moved; and said rear bearing member comprises a rear bearing plate spaced from said attachment plate by a closure member to enclose said spring cartridge means with said front bearing plate and spring disposed therein.

3. The spring biasing device recited in claim 2 wherein:

said safety means includes a retaining member having a first end for removably securing said retaining member to the shaft, an elongated body portion extending through and slidable relative to an aperture in said front bearing plate and an enlarged second end larger than said aperture for preventing separation of said front bearing plate from the shaft, and said elongated body portion enables said first end of said retaining member to project externally of said spring cartridge means through said opening in said attachment plate.

4. The spring biasing device recited in claim 3, wherein said first end of said retaining member enables a connection to be made with the end of the shaft to secure said retaining member to the shaft.

5. The spring biasing device recited in claim 4 wherein:

said retaining member includes a bolt terminating at said first end for cooperating with a hole in the end of the shaft and at said enlarged second end in a bolt head;

said safety means further includes a locking nut for cooperating with the end of the shaft to lock said bolt to the shaft;

said locking nut will pass through said opening in said attachment plate for providing access to said nut exteriorly of said spring cartridge means.

6. The spring biasing device recited in claim 5 wherein said front bearing plate includes abutment means for cooperating with said nut to provide a surface for pushing said front bearing plate toward said rear bearing plate when the shaft is moved, said abutment means comprising a counterbore in said front bearing plate substantially coaxial with said aperture and having a diameter large enough to permit said nut to abut the bottom of said counterbore and a depth at least as deep as the thickness of said nut.

7. A valve actuator comprising:
a linkage housing;
an actuator power shaft having an axis and extending through said linkage housing and carried therein for reciprocating movement along the shaft axis;
a power source mounted to the linkage housing for providing motive power to one end of said power shaft to reciprocate said power shaft;
an actuator output shaft mounted for rotation in said linkage housing and including connection means for securing said actuator output shaft to a valve stem for rotation thereof;
linkage means disposed in said linkage housing for converting reciprocating axial movement of said actuator power shaft into rotary movement of said actuator output shaft; and
a spring biasing device having spring cartridge means including an attachment member removably securing said spring biasing device to said linkage housing, a rear bearing member secured to and spaced from said attachment member, a front bearing member disposed between said attachment member and said rear bearing member, said attachment member having an opening therein for passage of the shaft into said spring cartridge means, said front bearing member being larger than said opening, and a compression spring disposed between said front bearing member and said rear bearing member for providing a movement resisting force on the shaft and for resisting movement of said front bearing member by the shaft toward said rear bearing member, safety means securing the shaft to said front bearing member, said safety means being accessible from the exterior of said spring cartridge means for removably securing said spring-restraining means to the shaft to prevent disassembly of said spring-cartridge means from the shaft.

8. The valve actuator recited in claim 7 wherein:
said linkage housing includes a raised boss through which said other end of said actuator power shaft extends; and
said boss cooperating with the wall of said opening in said attachment member.

9. The valve actuator recited in claim 8 further comprising antirotation means for preventing rotation of said attachment plate relative to said linkage housing.

* * * * *